United States Patent [19]
Barrett et al.

[11] Patent Number: 5,570,111
[45] Date of Patent: Oct. 29, 1996

[54] GRAPHICAL USER INTERFACE CURSOR POSITIONING DEVICE HAVING A NEGATIVE INERTIA TRANSFER FUNCTION

[75] Inventors: Robert C. Barrett, San Jose, Calif.; Robert S. Olyha, Jr., LaGrange; Joseph D. Rutledge, Mahopac, both of N.Y.

[73] Assignee: International Business Machines Corporation, Armonk, N.Y.

[21] Appl. No.: 316,983

[22] Filed: Oct. 3, 1994

[51] Int. Cl.$^6$ ........................................ G09G 5/08
[52] U.S. Cl. .......................... 345/157; 345/145; 345/159
[58] Field of Search ........................... 345/157, 156, 345/159, 160, 161, 162, 163, 167, 145, 146

[56] References Cited

U.S. PATENT DOCUMENTS

| | | | |
|---|---|---|---|
| 4,386,346 | 5/1983 | Levine | 340/709 |
| 4,550,316 | 10/1985 | Whetstone et al. | 340/710 |
| 4,578,674 | 3/1986 | Baker et al. | 340/710 |
| 4,787,051 | 11/1988 | Olson | 364/518 |
| 5,012,231 | 4/1991 | Felsenstein | 340/709 |
| 5,168,221 | 12/1992 | Houston | 345/161 |
| 5,191,641 | 3/1993 | Yamamoto et al. | 395/118 |
| 5,214,414 | 5/1993 | Levine et al. | 340/709 |

FOREIGN PATENT DOCUMENTS

| | | | |
|---|---|---|---|
| 58-129643 | 8/1983 | Japan | G09G 3/037 |
| 63-73415 | 4/1988 | Japan | G06F 3/033 |
| 02184912 | 7/1990 | Japan | G06F 3/033 |
| 04305725 | 10/1992 | Japan | G06F 3/02 |
| 05249941-A | 9/1993 | Japan | G09G 5/08 |
| WO92/09982 | 6/1992 | WIPO | G09G 3/02 |
| WO92/18927 | 10/1992 | WIPO | G06F 3/033 |

OTHER PUBLICATIONS

F. J. Snow, Laser Optical Mouse Specification, Ser. No. 756,261, Office of the Chief of Naval Research Dept. of Navy, Code OOCCIP, Arlington, Virginia 22217.

Anonymous, Hand–Held Device for Cursor Control, RD–347090–A, Mar. 10, 1993.

Blalock et al., Pressure–Sensitive Mouse, IBM Tech. Disclosure Bulletin, vol. 35, No. 6, Nov. 1992.

Hanna, Method for Simplifying the Accurate Positioning of a Mouse Pointer, IBM Tech. Disclosure Bulletin, vol. 35, No. 4, Apr. 1993.

*Primary Examiner*—Richard Hjerpe
*Assistant Examiner*—Xiao M. Wu
*Attorney, Agent, or Firm*—James C. Pintner

[57] ABSTRACT

A user interface apparatus and method for a computing or processing system employing a graphical user interface is presented. In order to provide a good user feel, and specifically to avoid a feeling of inertia or sluggishness in cursor motion as the user starts or stops movement, the apparatus and method provide a negative inertia transfer function. That is, the cursor movement signal produced by applying the input parameter to a transfer function in accordance with the invention is related to a sum of (i) the input parameter, and (ii) a signal related to the rate of change of the input parameter. This is preferably implemented as an additive high-pass transfer function. Preferred embodiments can employ analog circuitry or a digitally programmed transfer function algorithm. The input parameter to which the transfer function is applied can be a magnitude signal, such as that from a polar coordinate system, or separate components, such as x- and y-components from a rectangular coordinate system, can be treated separately.

21 Claims, 4 Drawing Sheets

GRAPHICAL USER INTERFACE CURSOR POSITIONING DEVICE HAVING A NEGATIVE INERTIA TRANSFER FUNCTION

FIELD OF THE INVENTION

The invention generally relates to the field of graphical user interfaces for computers and processing systems. More particularly, the invention relates to an apparatus and method for translating user input movements into movements of a symbol, such as a cursor, on the graphical user interface.

BACKGROUND OF THE INVENTION

Since the advent of Graphical User Interfaces (GUIs) in interactive computing systems, a great deal of effort has gone into the ergonomics of the GUI. That is, developments in GUI technology have pursued the goal of making the GUI more convenient and easier to operate, and also more intuitive for the user.

In a GUI, various images, including icons, windows containing application programs, etc., appear on a display screen. The icons and windows are graphical representations of application programs or utility functions. The user operates the system by moving images on the screen, and by providing input signals to the system, which the system interprets as commands to operate the application programs or utility functions. Commonly, the image which the user moves about the screen is a cursor, although the user can also move other types of images around. Persons skilled in the use of GUIs will readily recognize that the cursor must be precisely positioned on the desired icon, application program button, etc., for the input signals to be interpreted as desired.

To move the cursor on the screen, the user employs a user interface apparatus which includes a transducer for translating the user's activity, such as hand movements, fingertip pressure, etc., into an input parameter. Various types of devices include such transducers. Much of the discussion which follows will focus on (i) the type of input parameter provided by a given user interface device, and (ii) the particular relationship, or "mapping," between the input parameter and the cursor movement.

A popular device for enabling the user to perform cursor movements and to enter commands is called a mouse. A mouse is a mechanically simple device for producing a signal, responsive to physical displacement of the mouse by the user, which directs the system to move the cursor about the display screen. Generally, a mouse also includes one or more push buttons, which the user pushes in order to enter commands to the system. Responsive to a given movement of the mouse in a given direction, such as over a mouse pad or work surface, the cursor makes a movement in a corresponding direction on the display screen. In the case of a mouse, the input parameter can be a positional movement, i.e. a displacement or translation, or can also include factors relating to mouse velocity, as well as displacement. Thus, the mapping is from a mouse position (or velocity) to a cursor position.

A joystick may also be used for cursor movement. A typical joystick, such as that used in video games, is spring-biased in two dimensions to a middle position, corresponding with no cursor movement. Movement of the joystick responsive to user manipulation causes cursor movement. For such joysticks, displacement of the joystick, or a magnitude of force applied against it, serve as the input parameter. In general, the input parameter of a joystick is position, i.e., displacement from a resting position, and the mapping is from joystick position to cursor velocity (or, in some systems, cursor position).

Yet another type of user input device is generically called an isometric joystick. An isometric joystick is implemented as the TrackPoint II pointing device, currently available in the ThinkPad line of laptop computers by IBM Corporation. (TrackPoint II, ThinkPad, and IBM are registered trademarks of International Business Machines Corporation.) ThinkPad laptop computers include TrackPoint II pointing devices, conveniently built into the middle of the keyboard, between the G and H keys. ThinkPad units also include keyboard buttons, analogous to mouse buttons, for entering system commands.

A user operates a TrackPoint II device by pushing laterally against the top of the device with his/her fingertip. The device does not actually displace, as in the case with a joystick. The input parameter is the force applied by the user, and the force is mapped to cursor movement. The force against the device is sensed, and the cursor movement is made at a rate determined by the transfer function, over the length of time the pressure is applied.

The speed of cursor movement may be proportional to the magnitude of the force applied, or have some other predetermined relationship, as defined by the device's transfer function. For instance, the TrackPoint II device is implemented as having a sigmoid transfer function, including a "dead zone" in which very small forces are ignored, and a series of regions in the input parameter domain, where, in each region, the cursor movement is a piecewise linear function of the input parameter. The piecesise linear segments approximate the sigmoid shape.

Mice, joysticks, and TrackPoint II devices have in common the fact that cursor movement is related to an input parameter whose value is determined by user manipulation. In order to use one of these user interface devices effectively and comfortably, the user must develop a hand-eye coordination to efficiently move the cursor where he or she wants it to go. Whether this coordination will be comfortable for the user depends greatly on both the intrinsic feel of the interface device, i.e., the nature of the user manipulation which produces the input parameter, and the particular transfer function which translates, or maps, the input parameter to actual cursor movement.

Accordingly, one of the fundamental problems in the ergonomics of GUIs is the problem of just how to map the input parameter into cursor movement. A good solution to this problem would facilitate such hand-eye coordination, i.e., provide a "good user feel". The terms "transfer function," "mapping," and "dynamic response" are used to denote the means by which the input parameter is translated into cursor movement. On the other hand, a poor solution to the problem makes use of the interface difficult for the user. If hand-eye coordination is difficult for the user, many annoying manifestations, such as minor movements of the cursor to locate the cursor precisely on the desired location, result.

One way to translate or map the input parameter into cursor movement is to have a simple instantaneous, linear relationship. That is, cursor movement or speed is proportional or otherwise related, at any given point in time, to the magnitude of the input parameter at that point in time.

However, this transfer function has not necessarily provided the best possible user feel. The issue of user feel is particularly important around transients, i.e., where the cursor is just beginning to move or is just stopping. A linear transfer function has a user feel drawback which might be described as "inertia." Inertia is the feeling that a cursor just beginning motion is sluggish, or that a moving cursor will not stop responsively enough, so that it will tend to overshoot the desired destination on the display screen. Therefore, other types of transfer functions have been considered in order to improve user feel or hand-eye coordination by dealing with transients.

For instance, in co-pending U.S. patent application No. 07/917,091, filed Sep. 25, 1992 as a U.S. National Stage application under the Patent Cooperation Treaty, based on PCT International Application PCT/US90/06830, filed Nov. 29, 1990, and published as WO92/09982, there is a teaching of a cursor control system in which a parabolic-sigmoid transfer function is used. That is, if the force input parameter is near the upper end of its range, the cursor velocity output reaches a plateau value, i.e., a value which stays substantially constant as the input force parameter varies in the vicinity of its upper limit. As a result, a tendency of the cursor to overshoot the desired destination because of excessive speed is reduced. It will be seen, however, that while the transfer function given in the '091 application is nonlinear, it nevertheless produces a cursor velocity based solely on the simultaneous, instantaneous value of the input force parameter.

Another example of a conventional transfer function is given in Levine, U.S. Pat. No. 4,386,346, "Cursor Controller". There is described a controller intended to decrease the tendency for cursor movement to overshoot the intended target. Levine proposes to reduce the tendency to overshoot by compensating for the user's reaction time. This goal is accomplished by providing a control circuit which generates a correction signal having a value related to the speed of cursor movement and to the user's reaction time. Thus, when the user ceases moving the cursor, the correction signal is of the right magnitude to compensate for the amount of overshoot resulting from the user's reaction time at the speed at which the cursor was moving.

The user's reaction time is established, initially, by using a table of correction values based on an average user reaction time. Later, the numbers in the table are changed to more accurately reflect the reaction time of the individual user (column 4, lines 30–33).

In operation, an assumption is made that the user will overshoot the desired cursor destination by a distance related to the reaction time. An overshoot voltage signal is calculated based on the reaction time. A correction voltage signal, equal to the overshoot voltage signal, is then calculated and applied to the cursor to move it back from the position reached by overshooting to the intended destination.

Since the overshoot correction is applied when there has been a change in the user's manipulation of the input device, indicating that the user wants to stop the cursor, it may be said that the operation of the Levine transfer function depends both on the instantaneous state of the user's input (i.e., the dropoff of the input toward zero), and on the user's input which has occurred in the immediate past (i.e., the input during the interval where the user is seeking to move the cursor toward the desired destination).

Yet another approach is given in Felsenstein, U.S. Pat. No. 5,012,231, "Method and Apparatus for Cursor Motion Having Variable Response." Felsenstein takes a more sophisticated approach to dealing with transients. Felsenstein begins by observing that the transfer function, or "dynamic response," should be "different for slowing actions than it is for speeding actions" (column 2, lines 31–32). It acknowledges the use of a "quickening" circuit for smoothing operation at a point of transition (column 2, lines 15–18), and provides a circuit, whose behavior is described starting at column 5, line 57, responsive to displacements of a joystick.

The Felsenstein circuit is reproduced in FIG. 1 of the present patent application, as a showing of prior art. The reference numbers which appear in this drawing, as it appears in the Felsenstein patent, have been left intact. However, the full discussion of the illustrated components, referenced by number, has been omitted. The reader of this patent application is directed to the Felsenstein patent itself for that discussion. The comments on FIG. 1 which follow will be limited to certain individual points relating to the illustrated circuit.

If the joystick is displaced stepwise from its quiescent (resting) position, i.e., to begin moving the cursor at a given velocity, the Felsenstein circuit operates to create an exponential function, which causes the cursor to begin moving slowly, and then asymptotically to approach the target velocity. That exponential function is given by the following equation:

$$V_{58} = -V_{16} \left( \frac{R_{48}}{R_{50}} (1 - e^{\frac{t}{(R_{54})(C)}}) \right)$$

In this equation, the values are those associated with various components of the circuit of FIG. 1. That is, C is the value of capacitors 40 and 42, the voltages are those whose subscripts match the circuit junctions likewise numbered, and the resistance values are the resistances of analog transmission gates likewise numbered. Note, by the way, that a detailed analysis of Felsenstein's circuitry demonstrates that the exponent of the Euler constant e in the equation as it appears in the Felsenstein patent is missing a minus sign which it should have. The equation has been quoted above as it appears in Felsenstein, including this error.

Similarly, when the joystick displacement is removed, the cursor velocity decreases to zero according to an exponential function having a time constant different from that of the former exponential function. Thus, in effect, Felsenstein's transfer function acts as a low pass filter, and behaves even more sluggishly than other conventional systems. Felsenstein asserts, at column 6, lines 6–9, that this behavior is "more kinaesthetically pleasing to an operator" than a conventional transfer function.

It will be seen, then, that around the time of a transition in value for the input force parameter, the Felsenstein system produces a cursor velocity value which depends on both the prior and the present input parameter values, since the voltage $V_{58}$ is "exponentiating" from the one to the other.

Additionally, note that Felsenstein differentiates the joystick signal, using a differentiator 22 in FIG. 1. However, this differentiated signal is not used directly as part of the input parameter to be applied to the transfer function to obtain the cursor movement signal. Rather, the differentiated signal is applied to a discriminator circuit 26, whose comparators 28 and 30 drive inputs of a latch 32, based on the polarity of the differentiated signal. That is, the high-true and low-true outputs (34 and 36, respectively) of the latch 32 respectively indicate whether the signal is increasing or decreasing. In column 4, line 58, through column 5, line 4, there is a description of the circuitry used for switching the network of analog transmission gates (ATGs) and the capacitors 40 and 42. The switching is used to select between two different levels of sluggishness.

None of these prior art teachings have satisfactorily solved the inertia problem described above. While Levine attempts to deal with overshoot, it leaves unanswered the problem of sluggish initiation of movement. Moreover, the Levine technique for producing a compensating cursor movement to make up for the overshoot is rather simple-minded, in that it assumes that the user's reaction time begins when the cursor reaches the destination. If the user becomes more adept at using the interface device and begins to anticipate, the overshoot will be smaller, but the compensation will be the same. Thus, the compensation will, in effect, cause an undershoot of the intended destination.

Felsenstein in fact increases the inertia problem by causing the transfer function to be even less responsive to user input than conventional linear response transfer functions. With all due respect to Felsenstein's kinaesthetic sensibilities, it is submitted that sluggishness in the dynamic response of a GUI cursor moving and pointing apparatus and method is a problem which remains to be solved.

SUMMARY OF THE INVENTION

It is therefore an object of the present invention to solve just such a problem as that described in the Background, and apparently exacerbated by the prior art "smoothing" technique, which, by causing the signal to "exponentiate" from an old value to a new value, increases inertia.

It thus is an additional object of the invention to provide a user interface device for controlling cursor movement on a display screen by providing a negative inertia, thereby overcoming the inertia, or sluggishness, experienced by users in conventional user interfaces.

To achieve these and other objectives, there is provided in accordance with the present invention a pointing apparatus, for use in a graphical user interface of a processing system, in which a user directs the positioning and movement of a symbol displayed on a display screen of the processing system.

The apparatus includes a transducer for translating user activity, such as manipulation of the transducer, into an input parameter. Also, the apparatus according to the invention includes a transfer function unit, coupled to receive the input parameter. The transfer function unit produces a symbol movement signal whose value, responsive to the successive input values, represents an amplification of changes of value of the input parameter. That is, if the user begins manipulating the transducer, such as by beginning to press his or her fingertip against an isometric joystick, the input parameter changes from zero to a finite value. That finite value, by itself, would result in a given cursor movement using a conventional transfer function. However, the amplification of the change in input parameter value in accordance with the invention causes the symbol to move on the screen with greater responsiveness than is the case conventionally. Accordingly, the invention achieves the advantageous reduction in perceived symbol inertia, and therefore provides better user feel.

While the invention is applicable generally to the user-manipulated movement of displayed symbols, it will typically be practiced with regard to the movement of a cursor on a GUI screen. Therefore, the discussion which follows should be understood to apply to either symbols in general, or cursors in particular. For the purpose of the present discussion, the term "symbol" will be used to mean any image, cursor, icon, window, or other object or item which is displayed on a GUI screen.

The input parameter is treated as a function of time, reflecting the time-varying nature of the user's actions. This time-varying input parameter can be either a continuous parameter, or a sequence of discrete time values, such as a sequence of values produced by sampling a continuous parameter.

The invention may more easily be understood in terms of its square wave response. Responsive to a transition of the input parameter from the first value to the second value, the transfer function unit produces a cursor movement signal whose value changes from an initial value and approaches a steady-state value after having a value which, during a transient period, differs from the initial value in excess of a difference between the initial value and the steady state value. Movement of the cursor on the screen is then controlled, based on the cursor movement signal.

It will be seen that, since during the transient period the change in value of the cursor movement signal, from the initial value, exceeds a difference between the initial and steady-state values, a particularly large and noticeable motion of the cursor results. Therefore, the user will perceive the transfer function as having a negative inertia characteristic. This improves the user feel by making the cursor more advantageously responsive to the user's operation of the user interface device.

The transfer function unit preferably includes an additive high-pass filter. However, persons skilled in the art will recognize that there are numerous alternative ways of achieving the result of overcoming sluggishness, which fall within the spirit and scope of the invention.

BRIEF DESCRIPTION OF THE DRAWINGS AND APPENDIX

FIG. 1 is a schematic diagram of a prior art cursor control circuit as taught in Felsenstein, U.S. Pat. No. 5,012,231.

The APPENDIX is a pseudocode listing of a preferred software implementation of the invention.

DESCRIPTION OF THE PREFERRED EMBODIMENT

First, the invention will be described in general, with regard to FIGS. 2 and 3. A preferred analog implementation of the invention will be discussed, in connection with FIG. 4. Then, a preferred software implementation, given in the APPENDIX, will be discussed. Finally, implementations of the invention in various user interface systems will be discussed, with reference to FIGS. 5, 6, and 7.

As discussed above, one important manifestation solved by the invention occurs during transients, i.e., when the user starts or stops cursor motion. When a user begins moving the cursor, the user clearly wants to move the cursor somewhere.

A finite, perceivable time is required to apply the appropriate force in order to get the cursor moving at the velocity desired. If that time is large enough, as is the case with conventional user interfaces, then the user can become frustrated by the sluggishness of the cursor. Likewise, if the user releases the force on the user interface device when the cursor reaches the desired destination, then, as the force drops to zero during a finite time, the cursor overshoots the destination.

For the purpose of this discussion, the term "transient period", or the like, will not necessarily be limited to the time during which the input parameter is in a transition, but may additionally include some subsequent time interval during which the negative inertia output continues changing value.

Figure 1:
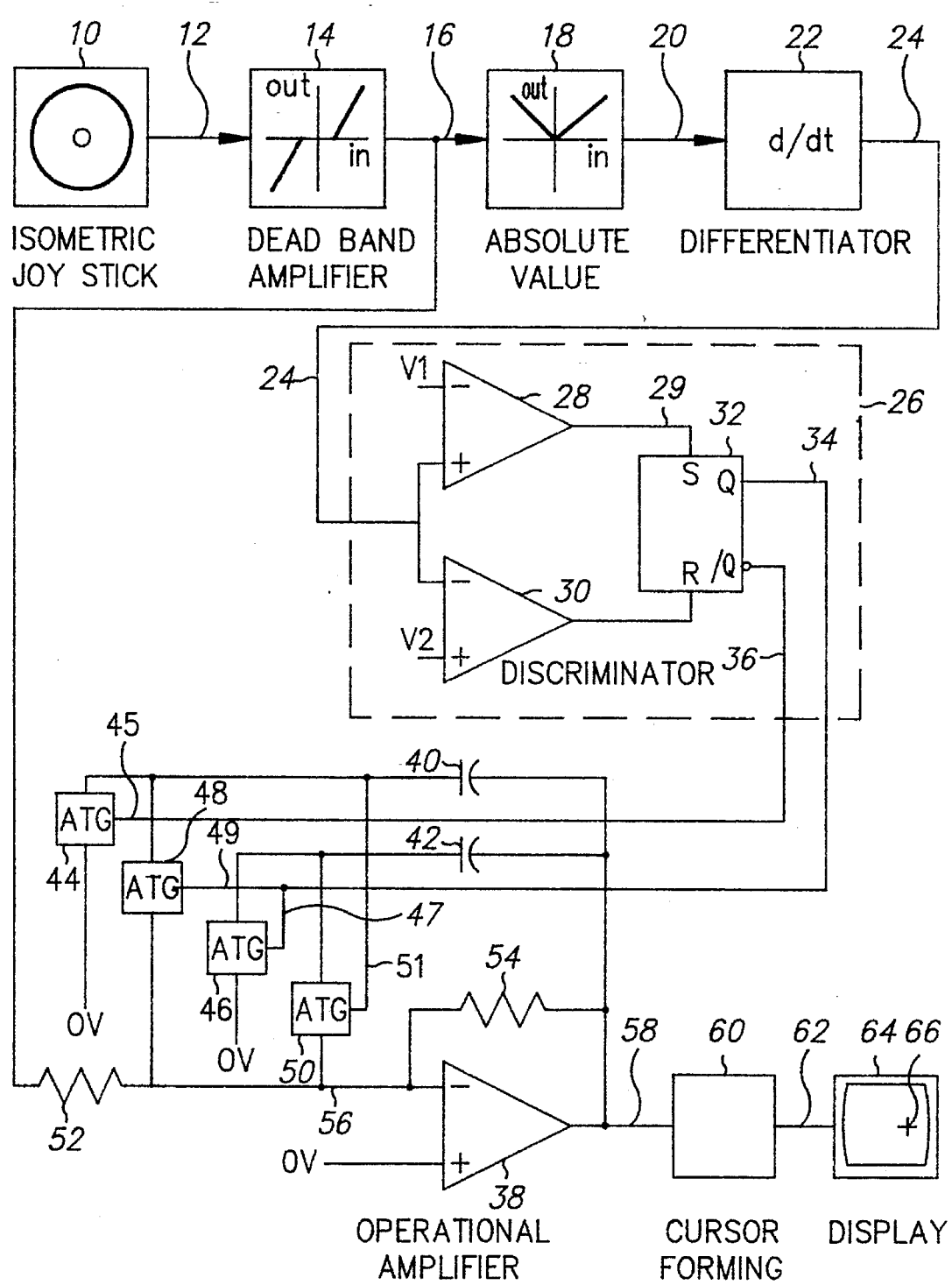
Figure 2:
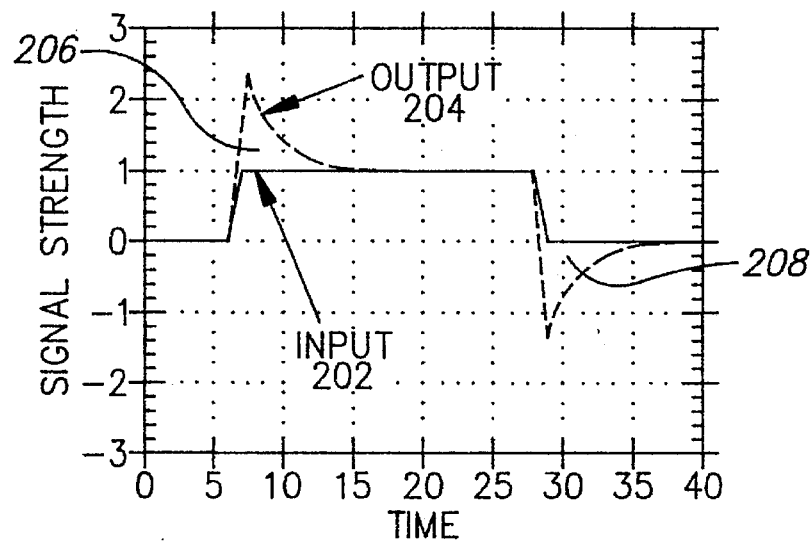
FIG. 2 is a graph showing a transfer function as implemented in accordance with the invention.

In accordance with the invention, a transfer function is provided as shown in the graph of FIG. 2. An input parameter curve 202 is shown in the form of a "square wave," moving from zero to a finite, positive value at a first time, and returning to zero at a second, later, time (solid line). Likewise, an output curve 204, shown as a dotted line, illustrates a transfer function in accordance with the invention. FIG. 2 in essence shows the "square wave response" of the transfer function of the invention, which is commonly recognized as a useful way of illustrating and understanding transfer functions.

In general, it will be seen that the transfer function is additive, in that it is a sum of a first signal and a second signal related to the rate of change of the first signal. Specifically, if the first signal is taken as a square wave, then the second signal is an upward going pulse coincident in time with the rising edge of the square wave, and a downward going pulse coincident in time with the falling edge of the square wave. The sum of these two signals looks like the curve 204 of FIG. 2.

In the discussion which follows, analog implementations of the invention will be covered, which have characteristics as shown in FIG. 2. Also, a programmed implementation will be shown. In this latter implementation, instead of a continuous curve, discrete time values are produced.

A preferred implementation of the invention involves using a high-pass filter to produce the second such signal, and summing the high-pass filtered signal with the original signal. As a result of the additive high-pass characteristic of the transfer function according to the invention, the output exceeds a steady state magnitude for a transient period following an upward transient, and the output falls below the steady state magnitude for a transient period following a downward transient. This is illustrated in the form of regions 206 and 208, respectively, which lie between the two curves during the transient periods.

More generally, the curve 204 may be described as changing in value from an initial value and approaching a steady-state value after having a value which, during a transient period, differs from the initial value in excess of a difference between the initial value and the steady state value. An additive high-pass filter is a convenient way of implementing the invention, since the excess of the output signal 204, beyond that of the input signal 202, is the result of the addition of the high-pass filtered signal. However, other techniques may be used to accomplish similar results.

It will be seen that, because the additive, or "sum", signal, differs from the initial value in excess of a difference between the initial value and the steady state value during the transient period, it provides a user feel in which the cursor movement has less inertia than that provided by conventional user interface devices. Accordingly, a user interface having a transfer function according to the invention overcomes the inertia problem described in the Background. A user interface according to the invention may be described as having "negative inertia."

While the embodiment illustrated in FIG. 2 indicates equal and opposite transient responses to the rising and falling edges of the square wave input, many extensions and variations are possible within the spirit and scope of the invention. For example, the pulse height, decay time, and other pulse parameters could be designed to depend on the sign of the transient, the magnitude of the transient, the time since the last significant transient, the magnitude and sign of the applied force or other input parameter, or any number of other factors which could be used to produce a better user feel.

Figure 3:
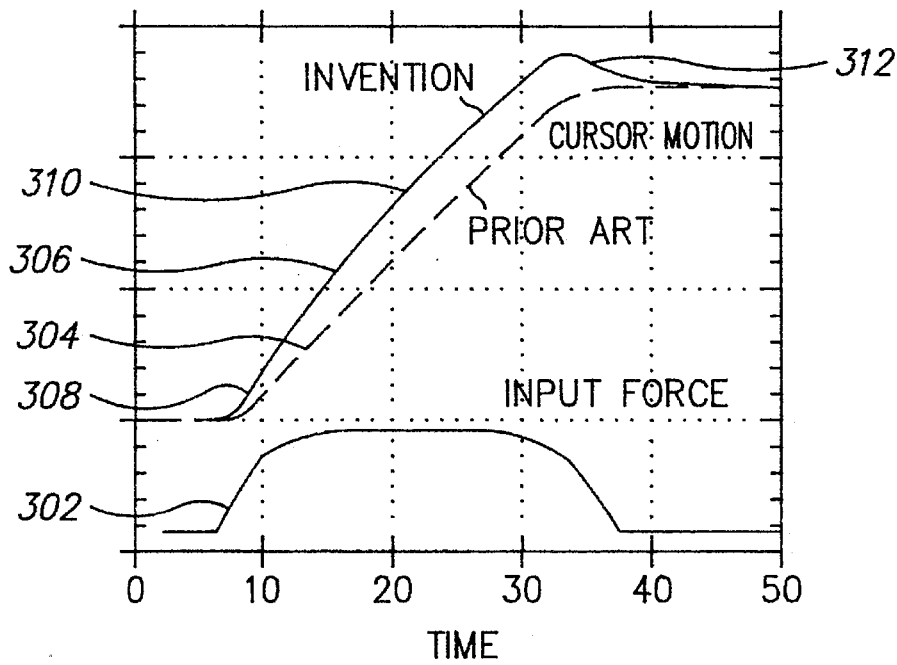
FIG. 3 is a graph showing cursor displacement based on the input and the transfer function of FIG. 2.

FIG. 3 is a graph which shows cursor motion in accordance with the invention. An input parameter is shown as a user input transducer force curve 302. The curve 302 has a quiescent or idle state corresponding with zero applied force and zero desired cursor motion, and an input force scale, representing arbitrary units of input force for illustrative purposes. As before, at a first point in time the user begins to apply force to the transducer. Over a finite time, the input parameter increases from zero to a finite, constant value. Later, the user releases the transducer, and over another finite time, the input parameter returns to zero.

Also shown in FIG. 3 are two curves representing cursor motion, responsive to the input parameter. A dotted line 304 represents the cursor motion using a conventional user interface, and a solid line 306 represents the cursor motion using a user interface according to the invention. Again, arbitrary units of cursor motion, which represent cursor displacement, are given.

The time scale is common for both the input force curve 302 and the output cursor motion curves 304 and 306, and is given in terms of arbitrary units.

In an initial time period 308, corresponding with the startup transient, the curve according to the invention moves above the conventional curve. This is the result of the negative inertia effect of the transfer function according to the invention. Referring back to FIG. 2, the square-wave-type curve 202 looks essentially the same as a curve representing the velocity of the movement of a conventional cursor, while the curve 204 looks like a velocity curve according to the invention. Accordingly, the greater velocity of the cursor according to the invention is represented in FIG. 3 in the time period 308, during which the cursor according to the invention moves at a greater velocity, and therefore the cursor, according to the invention, moves ahead of its conventional pace.

This is shown in FIG. 3 as an upward displacement of the curve 306 above the curve 304, which comes into being during the transient time 308, and remains in effect during a steady state motion time 310. During the steady state motion time interval 310, the rates of movement of the cursor according to both the conventional and inventive transfer functions are substantially constant, so the slopes of both curves look the same during the interval 310.

At approximately the time 30 on the scale, the cursor, in motion according to the invention, reaches the desired destination. Accordingly, the user begins to release the force on the transducer, so the curve 302 drops back to zero. This is a second transient time, shown as 312 in FIG. 3. Again, as shown in FIG. 2, the region 208 can be interpreted to represent a difference between the stopping of the cursor conventionally (the curve 202) and according to the invention (the curve 204). The region 208 of FIG. 2 represents the degree to which, during the second transient time, the (negative) difference between the curve 204 after and before the transition exceeds the steady state difference, represented in FIG. 2 as the difference between the signal strength values 1 and 0.

Again, as shown in the curve 306 of FIG. 3, the negative inertia characteristic of the transfer function causes the cursor motion to react to the second transient by stopping faster than it would in a user interface using a conventional transfer function, such as the conventional instantaneous linear transfer function. The cursor motion also reacts to the second transient by backing up, i.e., by decreasing in value, during the second transient period 312. By contrast, the less reactive, conventional curve merely comes to a stop, i.e., reaches a final cursor position represented by the flat portion of the curve 304 beyond the second transient period 312.

In the illustrated example of the behavior of the conventional and inventive transfer functions, it will be seen that the user begins to react by releasing the input force right about at the time at which the cursor reaches the final destination (that is, at the time when the curve 306 is about at the same height in the graph of FIG. 3 as the steady state value of both the curves 304 and 306 following the second transient). This may or may not be the case, depending on the user's reaction time, and on the user's ability to anticipate reaching the cursor's final destination, and reacting accordingly.

For some users of user interface devices embodying the invention, it will be preferable, for desired user feel, not to provide the backing up motion of the cursor as the input parameter drops off when the cursor reaches the desired destination. This is obtained by preventing the transfer function from generating an output which is opposite in sign to the input parameter. This is implemented using a suitable clamp so as to generate a zero output, or other suitable constant output, while the transfer function would otherwise generate an output opposite in sign to the input parameter.

Figure 4:
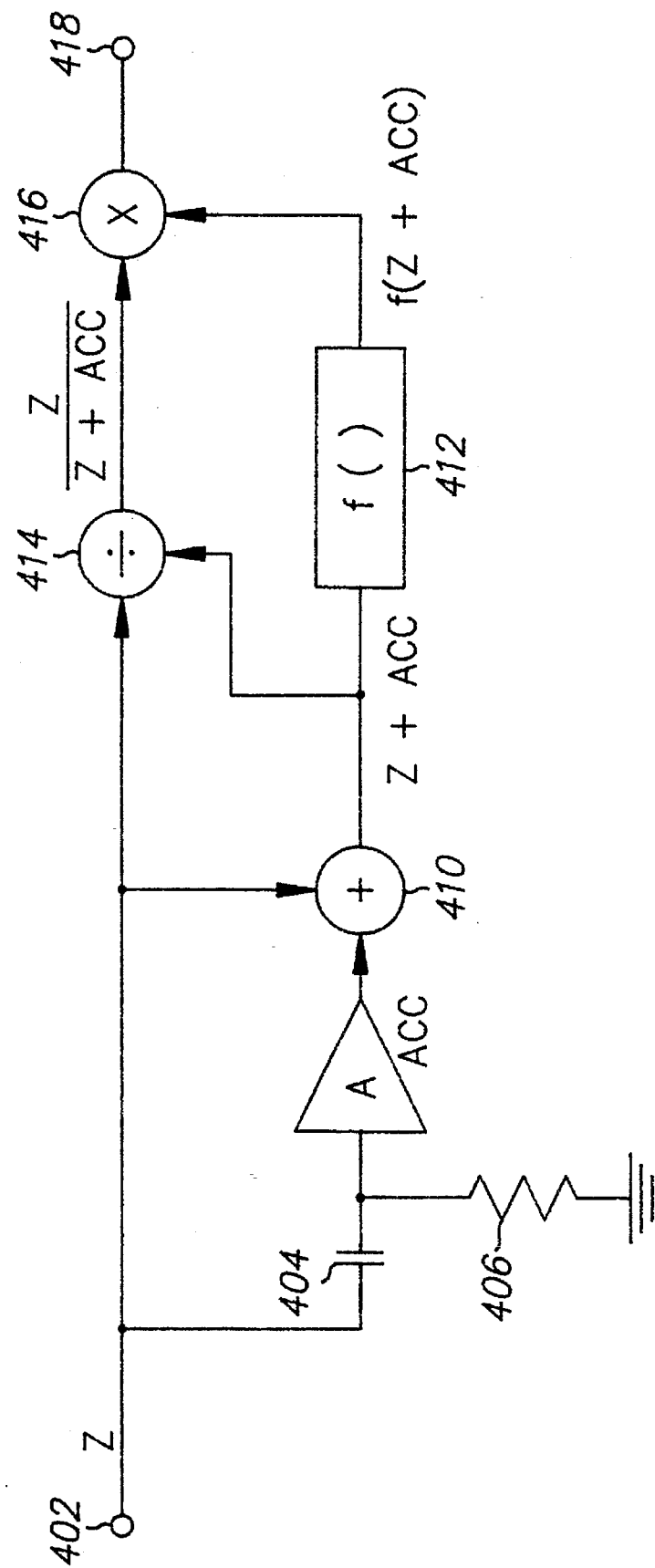
FIG. 4 is a schematic diagram of a circuit in accordance with the invention.

Referring now to FIG. 4, an analog circuit, for use with a user interface in accordance with the invention, is provided. At an input 402, an input signal "z" is received from a suitable transducer as discussed above. For instance, if a TrackPoint II type pointing device is used, the input signal z is a signal related to the force being applied to the TrackPoint device at that point in time.

The input signal z is provided to an RC circuit, including a capacitor 404 and a resistor 406, coupled between the input to the circuit, at which is provided the input parameter, and the input of an amplifier 408. As shown, one possible configuration for practicing the invention is to have the capacitor 404 coupled in series between the circuit input and the input of the amplifier 408, and the resistor 406 between the input of the amplifier 408 and ground. Persons skilled in the art of analog circuitry will know of other circuits which have comparable characteristics, and therefore can be used as memory circuitry in place of the illustrated components.

The RC circuit produces a signal having a differentiator, or high-pass filter, characteristic at the junction of the capacitor 404 and the resistor 406. This signal is amplified by an amplifier 408, to produce a signal designaged "ACC." This designation represents the high-pass filtered character of the signal ACC, that is, the fact that changes of value of the input signal z have been amplified, or accelerated, to produce the signal ACC.

ACC is added to the original input signal z by an adder 410, thereby producing an additive signal z+ACC. In the preferred embodiment, as shown, the additive signal z+ACC includes a differentiated, or high-pass filtered, signal ACC, added to the original signal z. The graph of FIG. 2 shows an example of the additive signal z+ACC. The additive signal z+ACC is then provided to a "transfer function" unit 412, which subjects the signal to a conventional "transfer function."

At this point, a clear definition will be made as to how the term "transfer function" is to be used. In general, a user input device maps user input activity to cursor movement in accordance with a particular formula. One such formula was the sigmoid, used in IBM's TrackPoint II device, as discussed in the Background. The present invention may be thought of as an "overlay" of that formula, since the present invention is intended to enhance the user feel, as distinct from the basic functionality of the user interface, as defined by the formula. Thus, in the implementations to be discussed, it will be seen that both the negative inertia aspect of the invention and the basic formula for a conventional device, such as that for the TrackPoint II device, will be included.

Since there is a potential for confusion in the usage of the term transfer function, the following convention regarding nomenclature will be used: Where the usage is intended to refer to the conventional formula alone, the term "transfer function" will be expressed in quotation marks. On the other hand, the term transfer function, without quotation marks, will be used to refer to the complete function, including both the "transfer function" and further functionality which implements the negative inertia aspect of the invention.

In the claims, the "transfer function" will be recited as a first transfer function, and a signal having been subjected to the transfer function will be recited as a transfer function output.

The preferred implementation of the invention employs a "transfer function" having a sigmoid shape, as discussed in the Background, and as implemented in IBM's TrackPoint II pointing device. A more detailed description of this implementation will be given below, in conjunction with the APPENDIX.

Returning now to FIG. 4, the unit 412 subjects the additive signal z+ACC to the above-described "transfer function." The result, f(z+ACC), is a cursor movement signal which shows both the effect of the basic "transfer function" and the amplification of the rate of change thereof. However, in accordance with the invention, an additional consideration is factored in. In the course of development, it was found that this resultant signal had a disadvantageous instability, which manifested itself as excessive reactions to small adjustments of the cursor position. Therefore, further in accordance with the invention, a scaling is performed, so that the effect of the amplification of the rate of change is reduced where the input magnitude of the rate of change is low.

For the purpose of clarifying the usage of terminology such as "small adjustments," "low magnitude of input parameter," etc., it should be understood that these are intended to apply with regard to the scale of movements that the user of a GUI system would typically employ. For instance, a cursor movement to drag an object icon the full width of a screen toward an application icon would not be a small adjustment, but a movement to accurately position the object icon so as to drop it onto the application icon, after reaching the vicinity of the application icon, would be a small adjustment. Also, the magnitude of input which the user would use to move the object icon the width of the screen would not be a "low magnitude," but the magnitude of input used for the fine positioning of the object icon onto the application icon would be a low magnitude. It is believed that, with these general guidelines and examples in mind, a person skilled in the art of GUIs would understand the distinction between large and small adjustments and magnitudes being described here.

The scaling is performed as follows: The additive signal z+ACC and the input signal z are both provided to a divider 414, as the divisor and the divident, respectively. The divider 414 produces a quotient, as shown in FIG. 4. This quotient serves as a scaling factor for the output of the transfer function unit 412. The scaling is performed by a multiplier 416, which takes as inputs the scaling factor from the divider 414 and the output of the transfer function unit 412, and produces a product, which is provided at an output 418. FIG. 3 shows an example of this output signal.

A detailed description of a preferred software embodiment of the invention will now be given. The APPENDIX provides a software implementation presently planned for inclusion in a soon-to-be-announced product offering. The software implementation as shown has three sections. First definitions of variables, used below in the Algorithm, are provided. Among the variables defined are x and y, the x-axis and y-axis forces applied by the user to a TrackPoint II type pointing device. These variables x and y are the user inputs to the Negative Inertia Algorithm. In the preferred embodiment, the x and y inputs are discrete time samples, taken at a sampling rate of 100 samples per second.

Also defined are X and Y, which are x-axis and y-axis cursor velocities, and are thus the cursor movement outputs of the Algorithm. The outputs are expressed in terms of "mickeys per second." A mickey is a whimsically named unit of mouse movement distance, which is familiar to persons skilled in the art of GUI systems. The particular nature of a mickey is dependent on the particular type of user interface apparatus employed in a given system. A mickey is defined in conjunction with the X and Y variables as the distance along the X or Y axis corresponding with one integer bit of the value of the X or Y variable. Here, the X and Y axes are expressed in terms of axes of the mouse itself, as distinct from the axes of the screen, or even axes of the surface over which the user moves the mouse. In practice, a mouse movement value, expressed in mickeys, is converted into a measure of symbol movement on the screen. The conversion is done according to whatever algorithm or transfer function (generally not linear) is used by the driver and other system application software.

Second, the Appendix provides a "transfer function," f( ), given as a list of subdomains of values for an input value n and formulas for computing the output value of the transfer function based on the input value within each subdomain. The subdomains run in value through an overall domain of values 0 through 255. This particular domain was used because the implementation given in the APPENDIX was made on an 8-bit system. Any other suitable domain could also be used. As shown, for some subdomains of input values n, the output is a constant. For other subdomains, the output is a function of n.

This "transfer function" has been used in IBM's TrackPoint II pointing device, discussed above, as implemented here. In accordance with the invention, however, additional processing of the signal to provide the advantageous negative inertia aspect of the present invention is implemented in addition to the original "transfer function." As given in the APPENDIX, the term "transfer function" has been used to refer to the sequence of values tabulated, and implemented in IBM's existing TrackPoint II device.

Third, the Negative Inertia Algorithm is given as a sequence of instructions which perform a mathematical calculation Since persons skilled in the field of programming will be equally comfortable with program code (or pseudocode) and flowcharts, the following discussion will refer to the calculations by line number, in lieu of steps in a flowchart.

The input values, x and y, are x and y components of the input parameter, such as joystick force or mouse movement. In step [1a], a magnitude z is calculated from the x and y components. Note that, while z is defined, in the Definitions, as the familiar square root of the sum of the squares of x and y, step [1a] computes z in terms of a numerical approximation thereof. In the particular implementation given in the APPENDIX, program memory space was short, so an approximation taking up less coding space was used. However, in implementations where there are no significant limitations on memory space, a suitable programming technique for calculating z in terms of a closer numerical approximation of the square-root- of-sum-of-squares formula given in the definition may advantageously be used.

In step [1b], z is reduced to a maximum value of 255, assuming that it had exceeded 255. This maximum also follows from the 8-bit implementation of the embodiment shown in the APPENDIX, and may be omitted (or suitably modified) for other implementations having different environmental limitations.

In step [2], a test is made for the condition in the first line of the transfer function, where, for n in the range 0–3, the output is 0. If n is greater than 3, the algorithm continues. This test provides a small "dead band" area, in which small motions of the cursor due to noise in the measurement of the force on the transducer are disregarded.

Next, in step [3], a discrete additive high pass filtering in accordance with the invention is made, in which a difference between z and a past value $z_0$ is scaled by an inertia gain factor I, and added to z to produce an inertia corrected magnitude $z_i$. One of the parameters which can be set, in accordance with the invention, is a time delay between the current value z and the past value $z_0$. The delay may be expressed either in terms of a time interval, in terms of a number of values in the sequence. In the preferred embodiment, $z_0$ is the value from 10 milliseconds prior to the current value z. However, $z_0$ could alternatively be, for instance, the n-th value prior to the current value z, n being a predetermined integer, or could be some weighted average of a number of previous values. Also, while the interval between z and $z_0$ is constant, it may also vary in a predetermined manner. Thus, it may be broadly stated that step [3] employs an expression including the present value and a past value, or possibly a plurality of past values, of the input parameter, or of components of the input parameter.

Since the magnitude is unsigned, the absolute value of $z_i$ is taken in step [4]. If $z_i$ were negative, the x and y values are inverted for the calculations to be made in steps [6a] through [6c] and [7a] through [7c]. Then, in step [5], the inertia corrected magnitude $z_i$ is input to the existing TrackPoint II device's "transfer function."

The result, Z, is the final magnitude to be used as the cursor motion signal. Finally, in steps [6a] through [6c] and [7a] through [7c], the x- and y-components of the cursor motion signal, designated X and Y, respectively, are produced and provided as outputs. The [6a], [6c], [7a], and [7c] expressions yield results whose signs match the signs of the input parameter, while the [6b] and [7b] expressions resolve the situations where there would otherwise be division by zero. The resulting cursor motion will be in the same direction as the original user input (possibly with a negative magnitude), since X and Y result from equal scaling of x and y.

To produce X and Y, the output Z of the transfer function is scaled by the ratio of x and y, respectively, to the inertia corrected magnitude $z_{i2}$. Scaling could alternatively be done using the magnitude z, rather than the inertia corrected magnitude $z_{i2}$. However, the non-linear gain in the negative inertia effect, which results from the use of $z_{i2}$, is preferred. This is because it is considered that good user feel results if the magnitude of the negative inertia effect, realized in accordance with the invention, is related to the magnitude of the input parameter. The x and y values are components of the original magnitude z. Since the formula for calculating the denominator, $z_{i2}$, of the ratio, $Z/z_{i2}$, is the expression given in step [3], it will be seen that, for small magnitudes of the input parameter, the ratio is also small, because the denominator value is primarily the $(z-z_0)*I$ term. On the other hand, for large input parameter values, the z term becomes the primary part of the denominator, and the ratio approaches the ratio of the component, x or y, to the magnitude z. Therefore, the expressions given in stops [6a] through [6c] and [7a] through [7c] are believed to produce a preferred user feel.

Given the preceding detailed description of analog and digital (programmed) implementations of the invention, implementations of user interface systems employing the invention will now be given as examples of how the invention is to be used. For the discussion which follows, the transfer function according to the invention is implemented in circuitry as shown in FIG. 4, or in software as discussed in connection with the APPENDIX, and included within the systems in the designated components at block diagram level. A discussion will now be given of implementations of a user interface according to the invention in user interface systems, including the above-referenced designated components.

Figure 5:
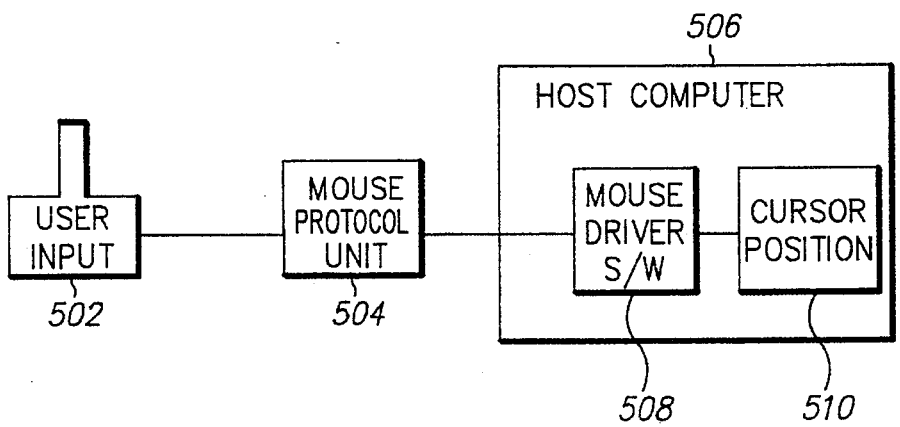
FIG. 5 is a block diagram of a system in accordance with the invention.

Referring now to FIG. 5, there is shown a block diagram of a system in which the invention is implemented in program code, as given in the APPENDIX. A user input device 502, including a transducer for producing an input parameter, is shown as an isometric joystick. The device 502 produces an input parameter, as described above. The input parameter is then provided to a protocol unit, here shown as a mouse protocol unit 504. A mouse protocol unit is suotable either for a conventional mouse, a track ball type positioning device, a conventional joystick, or an isometric joystick.

Mouse protocol units such as the unit 504 are well known in the art. Two different implementations of the mouse protocol unit 504 will be briefly described here. One involves quadrature signals (pulse trains), and is known as a parallel implementation. The parallel implementation was developed and manufactured by Hawley Laboratories of Berkeley, Calif.

Another well-known implementation of the mouse protocol unit 504 is known as a serial implementation. In a serial implementation, messages are transmitted between the mouse and the rest of the computer, such messages relating to how much the mouse has moved during a predetermined message interval. There are several such implementations, using different communication protocols. The preferred implementation uses a serial implementation, which was developed by IBM Corp., and is described in *IBM Mouse Technical Reference, First Edition* (Apr. 1987).

The mouse protocol unit 504 provides a signal to be processed to amplify the changes of value of the input parameter, as described above. The processing is done either by a host computer 506, or by a microcontroller. If a microcontroller is used, it is implemented as part of the user interface in a known manner. In a diagram of a system employing such a microcontroller, the microcontroller would occupy the same position as the host computer 506 in FIG. 5. Therefore, a separate illustration of a system employing a microcontroller has been omitted.

The host computer 506 (or the microcontroller) executes software as provided in the APPENDIX. The software is shown as 508 in FIG. 5. The result is a cursor movement signal, which has the negative inertia characteristic, in accordance with the invention, wherein changes of value of the input parameter have been amplified as discussed above. That cursor movement signal is then provided to a cursor position routine 510, which directs the positioning and movement of the cursor on the display screen of the processing system employing the user interface in accordance with the invention.

Figure 6:
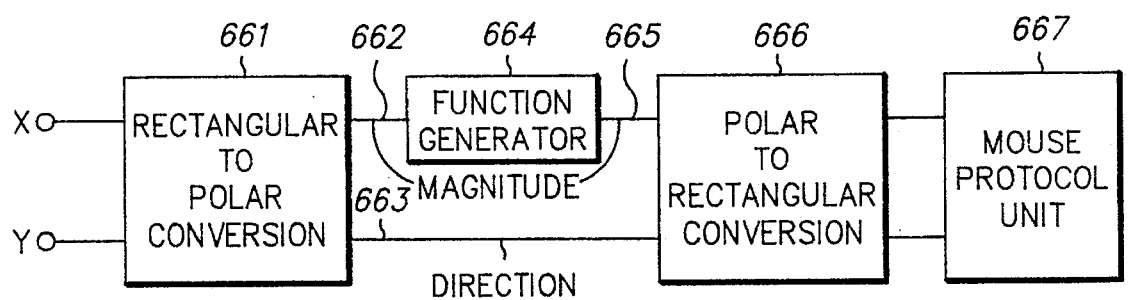
FIG. 6 is a block diagram of another system in accordance with the invention.

A system implementation of a force-to-velocity transfer function of the present invention is shown in FIG. 6. A user applies force to a joystick or other transducer, which has, as outputs, voltages proportional to the x and y components of the force applied by the user's fingers. These voltages are provided to a rectangular-to-polar converter 661, which converts the x and y components to directional and magnitude components. A digital system may do so through computation, as shown in the APPENDIX, while an analog system uses suitable circuitry which would be known to persons skilled in the art. The resultant polar magnitude and direction components are applied on lines 662 and 663, respectively. The magnitude component is sent to a function generator 664.

The function generator 664 takes as an input the voltage representing the magnitude of the force applied to the joystick, and gives, as an output, a cursor velocity signal on the line 665. The function generator 664 relates input force to output velocity according to the transfer function of FIG. 2 discussed above. The directional signal on the line 663 is passed directly through, since the transfer function is designed to alter the magnitude of the signals, but not the direction, except for 180° direction reversals if the magnitude changes sign. Of course, if other transfer functions were used which cause both magnitude and directional changes, then a suitable function generator would also be given in series on the line 663. Also, a suitable function generator may be placed in series in the line 663 to take care of direction reversals when the magnitude changes sign.

The resultant magnitude and direction signals are converted back to rectangular coordinates by a polar-to-rectangular converter 666, which provides x and y components of the cursor motion, as per the coding given in the APPENDIX, steps [a] through [c] and [a] through [c]. The cursor velocity signals are then provided over lines 668 and 669, respectively, to a mouse protocol unit 637 in order to make the cursor move with the velocity dictated by the cursor velocity signals.

While the embodiments described thus far perform the transfer function on the polar magnitude of the input parameter, it is also possible to implement the invention by performing the transfer function separately on the x and y components of the input parameter. If the invention were so implemented in programming, then (referring again to the programming in the APPENDIX) steps [1a], [6a] through

[6c], and [7a] through [7c] would be omitted, and the remaining steps would be performed separately for each component, where x and $x_i$, and then y and $y_i$, would take the place of z and $z_i$ in the calculations.

Figure 7:
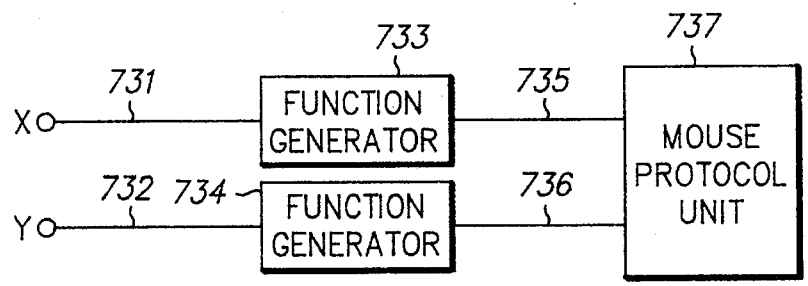
FIG. 7 is a block diagram of yet another system in accordance with the invention.

FIG. 7 is a modification of the implementation of FIG. 6, which also shows this variation of the implementation of the invention. In FIG. 7 the x and y signals are obtained from a force joystick as explained above in conjunction with FIG. 6. However, instead of being sent to a rectangular-to-polar conversion circuit, the x and y components of the input parameter are sent to respective function generators 733 and 734, which are preferably identical to the function generator 664 of FIG. 6. The function generators 733 and 734 each perform the transfer function shown in the APPENDIX, as described above. The rectangular coordinates output from the function generators 733 and 734 are then supplied to a mouse protocol unit 737, similar to the unit 667, which moves the cursor at a velocity determined by the inputs to the unit 737.

While either of the two basic approaches given above (either transforming x and y components separately or transforming the magnitude in polar coordinates) may be used in the practice of the invention. it will sometimes be the case that one or the other will lend itself better than the other to a particular application.

For instance, in a drawing application, it is particularly desirable that the cursor follow the user's movements exactly. Therefore, some implementations of rectangular coordinates may be less suitable than a polar implementation. This is because, in a rectangular scheme, the rates of change of the user-applied force in the x and y directionsmay be different. As a result, differences in scaling between the x and y coordinate pricessing may cause cursor motion in a direction slightly different from the direction of the user-applied force.

Also, where a "transfer function" having discontinuities, such as between flat regions and sloped regions as given in step [5] of the APPENDIX, are provided, small changes in the direction of the user-applied force may cause one of the force components to cross one of the discontinuities, and thereby cause large changes in the direction of the cursor movement. As a result, a diagonally moving cursor may wiggle back and forth a bit, in the manner of a fish swimming by waving its tail from side to side. This sort of artifact may not even be noticeable for other applications, such as word processing, but might be undesirable for a drawing application.

With the embodiment given in the APPENDIX, in which the force-velocity transfer function is embodied in step [3], it is possible to employ a plurality of different transfer functions for different user applications. Specifically, it is possible to use different inertial gain factors I, or different discrete time delays (where the time difference between the current value z and the delayed time $z_0$ varies). It is also possible to replace this rate-of-change calculation with other discrete-time additive high-pass filter functions as is well known to those skilled in the art.

The particular values used in step [3] may then be chosen to optimize performance for the particular application. For a word processing application, one transfer function may be optimal, while for a drawing application, another transfer function may be optimal. When a user decides to use the computer for a certain application, an optimal transfer function for that particular application can be used to relate the input parameter, such as joystick force, to cursor velocity.

As a user becomes more adept (or less adept) at controlling the velocity of the cursor, the user can change the transfer function to match the user's changing adeptness. The change can take place either directly by the user, or automatically, so as to match the skills and abilities of the individual user as he gains or loses facility in the use of the system.

The values of the inertial gain factor and the time delay could be changed, for example, so as to either compress or expand the width or height of the transient regions 204 and 208 of FIG. 2. Also, the transfer function may be altered only within a certain range of values so that, for example, the region 204 of FIG. 2 may remain the same while only the region 208 of the transfer function changes dimensions.

The automatically alterable transfer function discussed above could operate, for example, to check a user's performance level, in terms of the time it takes a user to accurately position the cursor, while using two different transfer functions. If the user's performance level is better with one of the transfer functions than with the other, then the transfer function could be automatically altered as discussed above.

While the preferred embodiments of the present invention have been illustrated in detail, it should be apparent that modifications and adaptations to those embodiments may occur to one skilled in the art without departing from the scope of the present invention as set forth in the appended claims.

---

APPENDIX
PREFERRED IMPLEMENTATION
OF TRANSFER FUNCTION

---

Definitions:

x = X axis force input (8 bit integer + 1 bit sign) (1 bit = 3.5 g)
y = Y axis force input (8 bit integer + 1 bit sign) (1 bit = 3.5 g)
X = X mouse axis output (8 bit integer + 8 bit fraction + 1 bit sign), (1 (int.) bit = 1 mickey)
Y = Y mouse axis output (8 bit integer + 8 bit fraction + 1 bit sign), (1 (int.) bit = 1 mickey)
z = calculated magnitude = SQRT(x*x + y*y) (8 bit int. (unsigned))
$z_0$ = z value from 10 milliseconds ago (8 bit int. (unsigned))
$z_i$ = inertia corrected magnitude,
    (8 bit int. (see formula 2 note below re:sign))
Z = output of transfer function (8 bit int. + 8 bit fraction (unsigned))
I = inertia gain factor (8 bit int. (unsigned)) (Default value = 6)
S = Sensitivity Gain Factor (8 bit int. (unsigned)) (default value = 128)
f() = transfer function: Input: (8 bit int. (unsigned))
    Output: (8 bit int. + 8 bit fraction (unsigned))

---

Tabulated Transfer Function f():

| input (n) | output (mickeys/sec) |
| --- | --- |
| 0–3 | 0 |
| 4–10 | 18*(100/256) |
| 11–16 | 56*(100/256) |
| 17–19 | (n-15)56*(100/256) |
| 20–30 | (n-1)16*(100/256) |
| 31–38 | (n-11)25*(100/256) |
| 39–49 | 704*(100/256) |
| 50–255 | (n-40)74*(100/256) |

---

Negative Inertia Algorithm:

| | |
| --- | --- |
| z = x + y − ((2 * Min(x,y))/3) | [1a] |
| if z > 255 then z = 255 | [1b] |
| if z < 4 then {Z = 0 and go to step 6} | [2] |
| $z_i$ = ((z − $z_0$) * I) + z | [3] |
| $z_{i2}$ = \|$z_i$\| | [4] |
| Z = f($z_{i2}$) | [5] |

-continued

APPENDIX
PREFERRED IMPLEMENTATION
OF TRANSFER FUNCTION

| | |
|---|---|
| $X = -x * (Z/z_{12})$ for $z_i < 0$; or | [6a] |
| $0$ for $z_i = 0$; or | [6b] |
| $x * (Z/z_{12})$ for $z_i > 0$ | [6c] |
| $Y = -y * (Z/z_{12})$ for $z_i < 0$; or | [7a] |
| $0$ for $z_i = 0$; or | [7b] |
| $y * (Z/z_{12})$ for $z_i > 0$ | [7c] |

What is claimed is:

1. An apparatus, for use in a graphical user interface of a processing system, for directing the positioning and movement of a symbol displayed on a display screen of the processing system, the apparatus comprising:

a transducer for translating an input activity of a user into an input parameter; and a transfer function unit, coupled to receive the input parameter, for producing a symbol movement signal whose value, responsive to the input parameter, represents an amplification of changes of value of the input parameter, the amplification having the same sign as the changes of value of the input parameter, the amplification including non-linear scaling;

whereby the amplification of changes of value of the input parameter is reduced for low magnitude of the input parameter, representative of user activity to make small cursor movements; and whereby movement of the symbol on the screen is controlled based on the symbol movement signal.

2. An apparatus as recited in claim 1, wherein the transfer function unit includes means for producing the symbol movement signal as being related to the sum of (i) the instantaneous value of the input parameter and (ii) a signal related to a rate of change of the input parameter having the same sign as the rate of change.

3. An apparatus as recited in claim 2, wherein the means for producing includes means for producing the symbol movement signal as being related to an additive high pass filtered signal.

4. An apparatus as recited in claim 3, wherein the means for producing includes:

a differentiator, coupled to receive the input parameter, for producing a differentiated signal; and an adder, coupled to receive the input parameter and the differentiated signal, for producing a sum thereof;

whereby the symbol movement signal is related to the sum.

5. An apparatus as recited in claim 3, wherein the means for producing includes:

means for subjecting the additive high pass filtered signal to a first transfer function to produce a transfer function output; and means for scaling the transfer function output.

6. An apparatus as recited in claim 5, wherein the means for scaling includes:

means for producing a scaling factor; and a multiplier, coupled to receive the transfer function output and the scaling factor, for scaling the transfer function output to produce the symbol movement signal.

7. An apparatus as recited in claim 1, wherein the transducer includes means for producing a sequence of discrete time values for the input parameter.

8. An apparatus as recited in claim 7, wherein the transfer function unit includes means for producing the symbol movement signal as being related to the sum of (i) the instantaneous value of the input parameter and (ii) a past value of the input parameter.

9. An apparatus as recited in claim 8, wherein the means for producing includes means for producing the symbol movement signal as an additive discrete high pass filtered signal.

10. An apparatus as recited in claim 7, wherein the transfer function unit includes:

programmed means for receiving the Sequence of discrete time values; and programmed means for performing calculations on the input sequence of discrete time values of the input parameter to produce corresponding successive discrete time values of the symbol movement signal, changes of value in the successive values of the input parameter being amplified in the corresponding successive values of the symbol movement signal.

11. An apparatus as recited in claim 10, further comprising a microcontroller for executing the programmed means for receiving and the programmed means for performing calculations.

12. An apparatus as recited in claim 10, wherein the processing system includes a host computer, and the programmed means for receiving and the programmed means for performing calculations are executed by the host computer.

13. An apparatus as recited in claim 10, wherein the programmed means for receiving includes means for receiving the sequence as a sequence of x and y components of the discrete time values of the input parameter.

14. An apparatus as recited in claim 13, wherein the programmed means for performing calculations includes means for converting the x and y components to polar coordinates.

15. An apparatus as recited in claim 14, wherein:

the programmed means for means for converting the x and y components to polar coordinates includes means for producing magnitude values, and the programmed means for performing calculations further includes means for performing calculations on the magnitude values to produce corresponding discrete time magnitude values of the symbol movement signal, changes of value in the successive values of the input parameter being amplified in the corresponding discrete time magnitude values of the symbol movement signal.

16. An apparatus as recited in claim 13, wherein the programmed means for performing calculations includes means for performing calculations separately on the x and y components of the input parameter to produce corresponding discrete time x and y components of the symbol movement signal, changes of value in the successive values of the x and y components of the input parameter being amplified in the corresponding successive values of the x and y components, respectively, of the symbol movement signal.

17. An apparatus as recited in claim 10, wherein the programmed means for performing calculations includes programmed means for performing calculations using a first expression including a present value and a past value of the input parameter, scaled by a first inertia gain factor, to produce corresponding successive discrete time values of the symbol movement signal, changes of value in the successive values of the input parameter being amplified in the corresponding successive values of the symbol movement signal.

18. An apparatus as recited in claim 17, wherein the programmed means for performing calculations includes programmed means for performing the calculations additionally using a second expression, the second expression also including a present and a past value of the input parameter, scaled by a second inertia gain factor.

19. An apparatus as recited in claim 18, wherein the programmed means for performing calculations includes programmed means for performing calculations using the first expression when the input parameter has a positive sign, and using the second expression when the input parameter has a negative sign.

20. An apparatus as recited in claim 18, wherein the programmed means for performing calculations includes programmed means for performing calculations using at least one of the first and second expressions, which of the first and second expressions is to be used being dependent on at least one of:

i. a sign of the changes of value, ii. a magnitude of the changes of value, iii. a time since a previous change of value satisfying a predetermined condition, and iv. a magnitude of the input parameter, v. a sign of the input parameter.

21. An apparatus as recited in claim 17, wherein the programmed means for performing calculations includes programmed means for performing the calculations using an expression including a present and a past value of the input parameter, scaled by an inertia gain factor, and for clamping the symbol movement signal to zero if the symbol movement signal would otherwise have a sign opposite to the sign of the input parameter.

* * * * *